United States Patent [19]

Dandridge, Jr.

[11] 4,081,196
[45] Mar. 28, 1978

[54] AUTOMOTIVE VEHICLE TRANSPORT SYSTEM

[76] Inventor: Ernest M. Dandridge, Jr., 631 Eagle Ave., Charles Town, W. Va. 25414

[21] Appl. No.: 734,108

[22] Filed: Oct. 20, 1976

[51] Int. Cl.² ............................................. B62D 39/00
[52] U.S. Cl. ............................... 296/1 A; 105/368 R
[58] Field of Search .......... 296/1 A; 105/367, 368 R, 105/378; 238/10 R

[56] References Cited

U.S. PATENT DOCUMENTS

| | | | |
|---|---|---|---|
| 3,580,627 | 5/1971 | Underwood | 296/1 A |
| 3,685,856 | 8/1972 | Blunden | 296/1 A |
| 3,690,717 | 9/1972 | Taylor | 296/1 A |
| 3,812,791 | 5/1974 | Barnard | 105/367 |
| 3,960,401 | 6/1976 | Harold | 296/1 A |
| 3,994,523 | 11/1976 | Harold | 296/1 A |

*Primary Examiner*—Joseph F. Peters, Jr.
*Assistant Examiner*—John A. Carroll
*Attorney, Agent, or Firm*—Kimbley L. Muller

[57] ABSTRACT

An automotive vehicle transport system is disclosed which comprises a tractor with a cab at the front end, and coupling unit at the rear end thereof and an overhead horizontally extending upper vehicle supporting ramp in combination with a trailer possessing at least one axle in the rear, a coupling unit in the front and three levels for securing automotive vehicles therein; the bottom section comprising a front lower ramp and a back lower ramp, the intermediate section comprising a rearward intermediate back ramp and an intermediate front ramp and the upper section comprising an upper front ramp, upper middle ramp and upper back ramp wherein the upper back ramp possesses a substantially horizontally adjustable track telescoping in the direction of the cab and the upper front and upper middle ramps possess a substantially horizontal bidirectional extending track.

21 Claims, 6 Drawing Figures

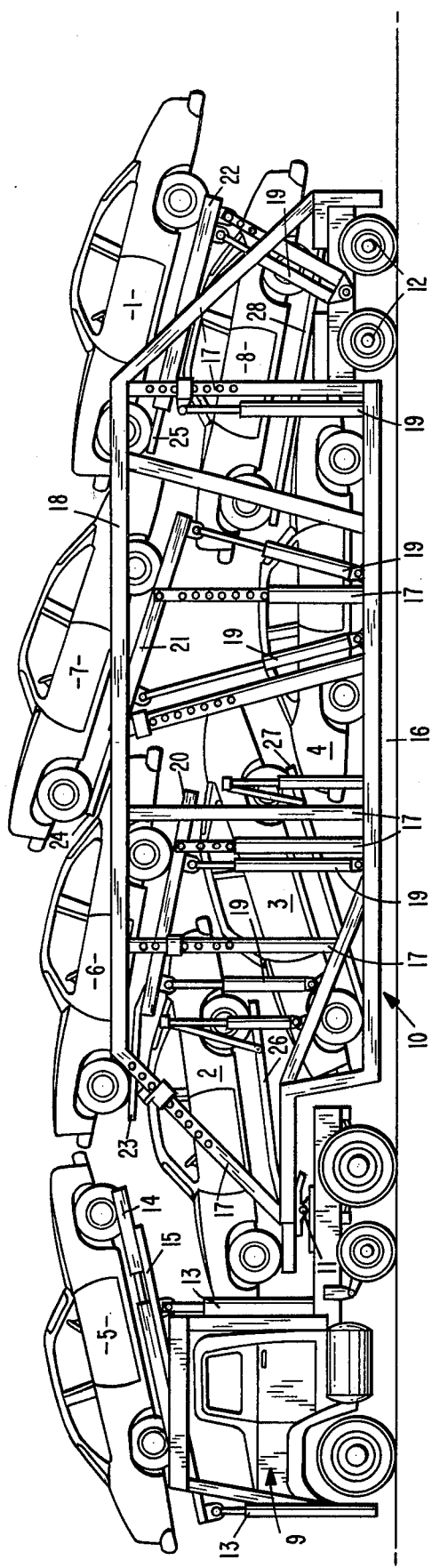
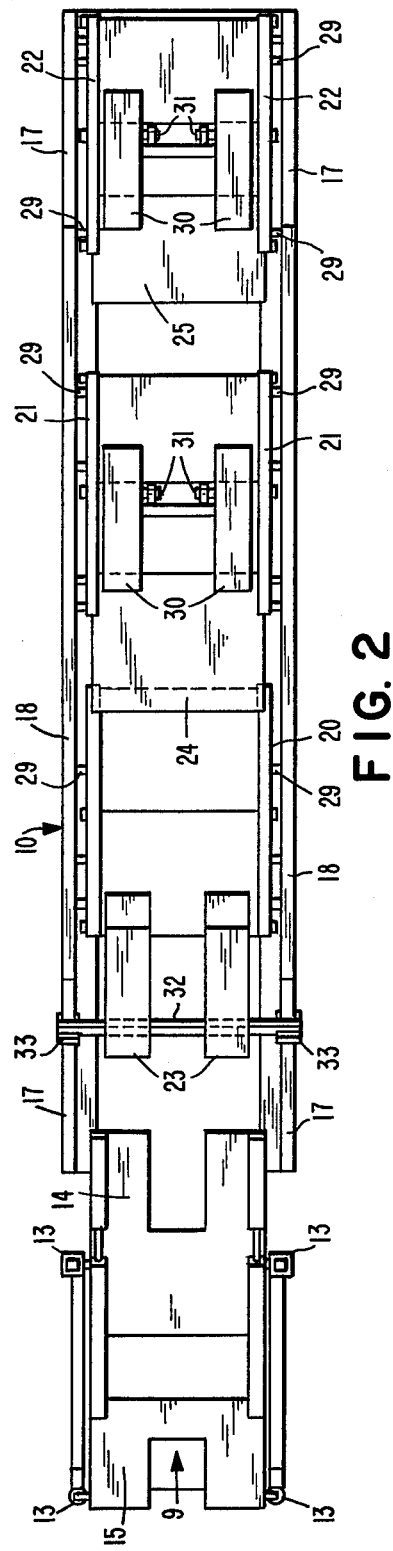

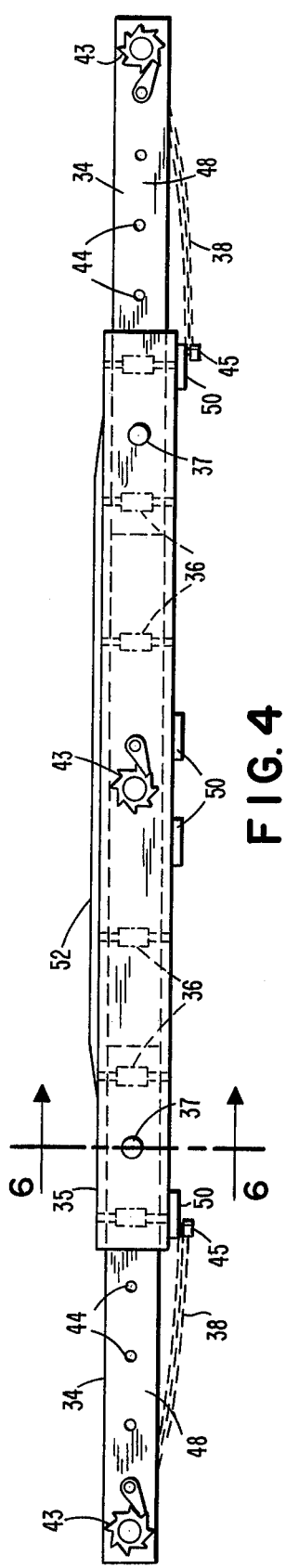
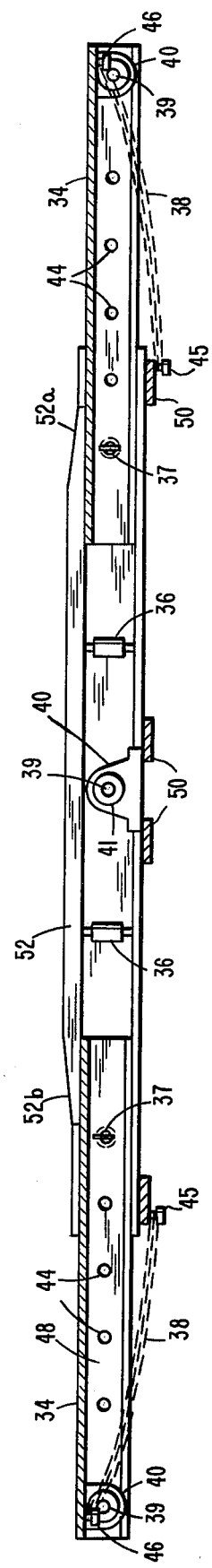
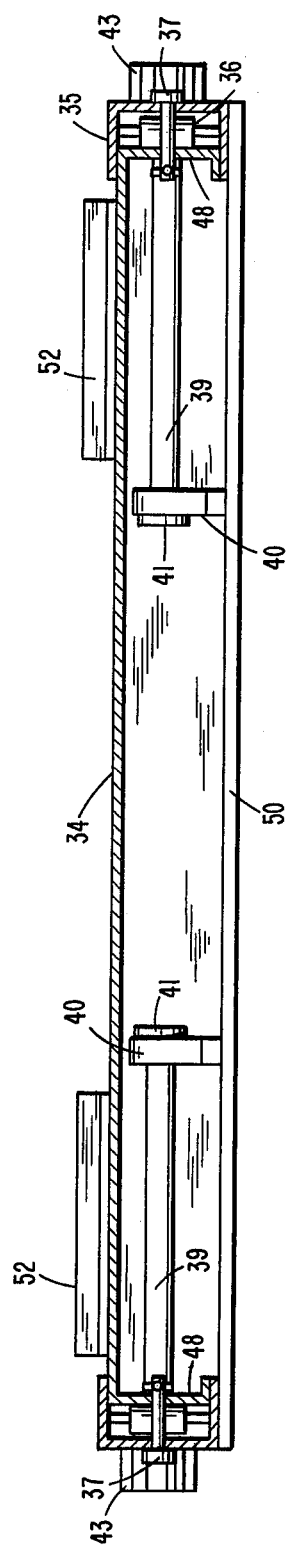

AUTOMOTIVE VEHICLE TRANSPORT SYSTEM

This invention relates to an automotive vehicle transport system and more particularly to such a system utilized in highway hauling for eight compact size passenger cars.

Regulations require that automotive vehicle transport systems comply with various legal maximum lengths and heights. In many geographic areas these regulations commonly require that the transport system should not exceed 55 feet in length and 13½ feet in height. As a result of the cost of transportation of automotive vehicles the carrier industry has utilized various designs to maximize the number of vehicles which may be transported in one haul. This invention addresses various problems indigenous to these transport systems and sets forth a system to obviate the various problems and maximize the number of vehicles which may be transported on one carrier.

The automobile industry is currently producing various motor vehicles such as cars and small trucks in various lengths, heights, shapes and designs. It is therefore desirable to provide a transport system wherein the tracks or ramps may be adjustable to hold cars of different sizes or wheel bases. Although cars of any wheel base may be transported on this vehicle transport system, it is a preferred embodiment that this system be adapted to transportation of eight compact size automobiles. A compact size automobile is herein defined as one possessing a wheel base of from about 103.0 inches to about 111.0 inches, a height of about 52.9 inches to about 54.3 inches, and an overall length of approximately 197 inches. However, this system may be applicable to haul any type of vehicle, not merely those of the compact species. It is axiomatic that this transport system may also be adapted to haul any feasible variety of mixtures of different size vehicles.

In contradistinction to the prior art this disclosure sets forth a transport system in which eight compact size passenger vehicles may be transported in one haul.

It is contemplated within the scope of this invention that various size passenger cars, trucks such as pickup trucks and small vans may be transported at the same time within the frame of the transport system. As a direct result of energy consumption, American passenger cars are beginning to be built shorter in overall length with shorter wheel bases. At the same time however, many popular American trucks are being built larger in size with longer wheel bases; this will increase the interest in a transport system designed preferably for varied length wheel bases. The versatility of an automotive vehicle transport system is personified by the fact that many car factories within the United States produce motor vehicles of differing wheel base. This requires transporting cars of mixed wheel base in one unit. Another situation which exemplifies the viability of an adjustable transport system is the fact that many ocean port terminals and railroad distribution yards accept shipments of automobiles and trucks with differing wheel base lengths. These mixed size vehicles must be placed in a vehicle transport system and hauled to their ultimate destination. Therefore, the mixing of different size wheel base automobiles to a maximum carrying limit on a transportation system is highly beneficial to carriers, manufacturers, dealers and consumers. It is conceivable that every vehicle on a transport system may be a different length, height, width and shape and that a most versatile carrier system is necessary to transport the same.

PRIOR ART

Candor compels a recognition of known prior art. Many automotive vehicle transport system patents are classified in class 296–1A. Within that subclass U.S. Pat. No. 2,587,456 discloses a carrier possessing two primary decks for maintaining motor vehicles during transit. Both bottom and top decks have a fixed dimension which runs the complete length of the trailer while taking into consideration upwardly or downwardly facing arcs of the bottom deck. However, there is no means by which the patentee gives each transported vehicle its own individual separate and unconnected track deck section. Further, there are no means herein to provide for adjustment of the track deck length. In U.S. Pat. No. 2,848,270 a transport carrier is designed possessing three upper ramps of which the track decks are hinged to hydraulic lifts which are attached to the body frame. The cars rest upon inclines at the middle and rear trailer top which result in the waste of unused space under the two rearmost vehicles. In U.S. Pat. No. 3,853,347, the trailer contains full vertically adjustable track deck sections, but has absolutely no provision for horizontal track adjustability. In contradistinction to this prior art, the instant invention provides for both vertical angle track adjustment as well as horizontal length track adjustment.

In U.S. Pat. No. 2,993,725, a carrier is disclosed which possesses track decks hinged to the top of the sides frames. The front deck is hinged at its front end to the side of the trailer. The tracks possessed therein are designed to have little vertical adjustment and no horizontal track adjustability and thus are stationary in length. In U.S. Pat. No. 3,084,970, vehicles are transported whereby the overall length of some of the tracks can be adjusted which consist of a primary one piece stationary track which has an additional track sliding over its top. This method of adjustability requires more space as a result of the additional thickness of the sliding track on top of the ramp. Further, only one end of the track decks have any means for horizontal adjustability. In contradistinction to the prior art, the invention herein discloses the horizontal adjustable track system wherein both ends of the track deck can be adjusted inwardly and outwardly on the same horizontal plane.

OBJECTS AND EMBODIMENTS

It is an object of this invention to provide an automotive transport system with bidirectional adjustable ramps.

It is a further object of this invention to provide an automotive transport system to accommodate as many as eight compact vehicles in one haul.

In one aspect of this invention an embodiment resides in an automotive vehicle trailer adapted for transporting seven passenger vehicles which comprises a frame possessing at least one axle disposed in the rear portion thereof and a coupling means disposed at the front portion thereof, said trailer further comprising a bottom section comprising a front lower ramp and a back lower ramp wherein said front lower ramp is vertically adjustable to maintain one of said passenger vehicles at an angle of from about 35° to about 50° and wherein each of said ramps contains one of said passenger vehicles; an intermediate section comprising an intermediate front ramp and a rearward intermediate back ramp wherein said intermediate ramps are vertically adjustable to an angle of from about 5° to 15° and wherein said intermediate front ramp is disposed to carry one of said passenger vehicles with a portion thereof positioned above said passenger vehicle disposed within said front lower ramp and said rearward intermediate ramp is disposed to carry one of said passenger vehicles with a portion thereof positioned above said passenger vehicle disposed within said bottom section back lower ramp; and, an upper section comprising an upper front, upper middle and upper back ramp wherein said upper back ramp possesses a substantially horizontal adjustable means telescoping in the direction of said cab and said upper front and upper middle ramps possess a substantially horizontal bidirectional extending means to maintain one of said passenger cars on said means.

Yet another embodiment resides in a transportation system vehicle carrier adapted for transporting eight compact passenger vehicles within a length of 55 feet and a height of about 13½ feet, said passenger vehicles having a length of about 187 inches to 197 inches, a roof of about 52.9 inches to 54.3 inches, and a wheel base of about 103.0 inches to about 111.0 inches comprising in combination a tractor having a main frame with a cab at the front end thereof, a coupling reception means at the rear end thereof and a horizontally extending upper vehicle supporting ramp on the tractor in connection with said frame extending over said cab, said ramp having a substantially horizontally extending track therefrom and; a trailer having a frame possessing at least one axle at the rear portion thereof and a coupling means at the front portion thereof to couple said trailer to said tractor, said trailer comprising a bottom section comprising a front lower ramp and a back lower ramp wherein said front lower ramp is vertically adjustable to maintain one of said passenger vehicles at an angle of from about 35° to about 50° and wherein each of said ramps contains one of said passenger vehicles; an intermediate section comprising an intermediate front ramp and an intermediate rearward back ramp wherein said intermediate ramps are vertically adjustable to an angle of from about 5° to 25° and wherein said intermediate front ramp is disposed to carry one of said passenger vehicles with a portion thereof disposed above said passenger vehicle disposed within said front lower ramp and said intermediate rearward ramp is disposed to carry one of said passenger vehicles with a portion thereof disposed above said passenger vehicle disposed within said bottom section back lower ramp; and, an upper section comprising an upper front, upper middle and upper back ramp wherein said upper back ramp possesses a substantially horizontally adjustable track telescoping in the direction of said cab and said upper front and upper middle ramps possess a substantially horizontal bidirectional extending track and wherein each of said three upper ramps contains one of said passenger vehicles.

A specific embodiment of this invention resides in a transportation vehicle carrier adapted for transporting eight passenger vehicles which comprises in combination a tractor having a main frame with a cab at the front end thereof, a coupling reception means at the rear end thereof and a horizontally extending upper vehicle supporting ramp on the tractor in connection with said frame extending over said cab, said ramp having a substantially horizontally extending track therefrom and; a trailer having a frame possesing at least one axle at the rear portion thereof and a coupling means at the front portion thereof to couple said trailer to said tractor, said trailer comprising a bottom section comprising a front lower ramp and a back lower ramp wherein each of said ramps contain one of said passenger vehicles; an intermediate section comprising an intermediate front ramp and an intermediate back ramp wherein said intermediate front ramp is disposed to carry one of said passenger vehicles with a portion thereof disposed above said passenger vehicle disposed within said front lower ramp and said rearward intermediate ramp is disposed to carry one of said passenger vehicles with a portion thereof disposed above said passenger vehicle disposed within said bottom section back lower ramp; and, an upper section comprising an upper front, upper middle and upper back ramp wherein said upper back ramp possesses a substantially horizontally adjustable track telescoping in the direction of said cab and said upper front and upper middle ramps possess a substantially horizontal bidirectional extending track and wherein each of said three upper ramps contains one of said passenger vehicles.

SUMMARY OF THE INVENTION

As hereinbefore set forth this invention relates to an automotive vehicle transport system containing horizontally slidable ramps for positioning and securing eight compact passenger vehicles on a 55 foot length tractor trailer which possesses a height of 13½ feet. The automotive vehicles are positioned by vertical hydraulic lifts so as to raise one ramp at a different angle than another. For instance, the ramp positioned above the cab may be tilted at an angle so as to afford visibility for the driver of the system and so as not to interfere with any of the seven vehicles on the trailer system. The positioned angle of the lower front vehicle may be maintained by means of conventional holding devices such as lock nuts or peg in hole holders in conjunction with the use of conventional vertical hydraulic lift cylinders. The upper middle, front and rear ramps can be positioned at an angle to provide available space for the three vehicles. For instance, the vehicle disposed on the upper rear ramp will be positioned above the vehicle in the intermediate rearward ramp. Likewise, the vehicle in the front upper ramp will be positioned over the vehicles in the front trailer nose and intermediate front ramp. Also the vehicle disposed on the upper middle ramp will be disposed over the lower front ramp, lower back ramp and intermediate rearward ramp. The vehicles parked on the upper ramps are maintained so that their wheel bases are situated on the track with its sliding member. For instance, the track may be slid horizontally towards the cab for the upper back ramp to provide a track of adequate length for positioning. The slideable ramp for the upper front and upper middle ramps may be slid through channels on the side walls of the holding structure in a bidirectional manner so as to provide a track for better positioning of the two vehicles held therein. It is noted that the slide track in the upper front ramp has positioned on its front end a pair of lift out track skids resting on the cross bar connecting both sides of the trailer frame with proper conventional locking devices to maintain the automotive vehicle in that position.

The slideable tracks of the present invention contemplate the movement of a metal track within the guidelines of the frame structure as exemplified by members 20, 21 and 22 in FIG. 1. The track may be slideable in a forward or aft position to better position the automotive vehicles. The track will comprise a channel with an inward groove to receive the sliding track. When the track is positioned at the desirable length it may be secured by the placement of a peg within a hole common to the track and channel structure. This peg must have a movement inhibiting device such as a cotter pin to prevent accidental removal as a result of vibration or the like. Also, it is contemplated within the scope of this invention that a safety chain or locking device may be utilized to guarantee against over extension of the horizontal track system.

DETAILED DESCRIPTION OF THE DRAWING

FIG. 1 is a side view showing the containment of eight compact passenger vehicles within the vehicle transport system.

FIG. 2 is a view looking down from the top of the vehicle transport system without the placement of the passenger vehicles thereon.

FIG. 4 is a side view of an expanded forward and aft track.

FIG. 5 is a longitudinal sectional view taken along lines 5 — 5 of FIG. 3.

FIG. 6 is a transverse sectional view as seen taken along lines 6 — 6 of FIG. 4 and shows the channel and track interlocking system.

Figure 3:
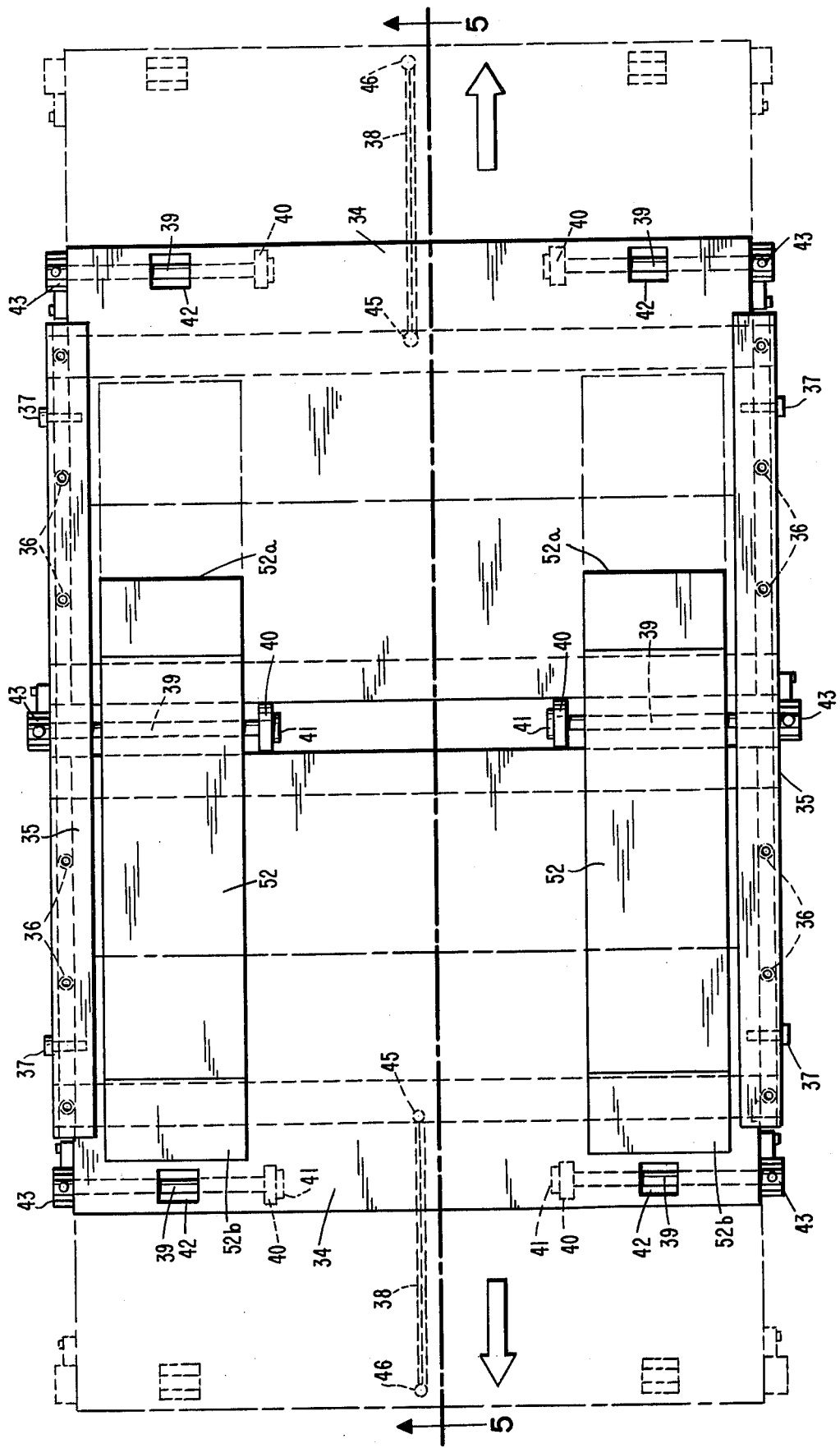
FIG. 3 is a top plane view of one horizontally adjustable track system of the present invention.

Coming now to a more detailed description of FIG. 1, eight passenger vehicles are shown herein as members 1, 2, 3, 4, 5, 6, 7, and 8. For convenience, the vehicles are numbered according to their loading sequence. Vehicle 5 is disposed on a ramp surmounted on truck cab 9. Passenger vehicle 4 is disposed on a lower back ramp not herein shown. It is however noted that this ramp may be possessed with hydraulic capabilities to raise the passenger vehicle in the lower back position for purpose of unloading. In other types of loads, the two track skids under car 8 can be stored between the wheels of car 4. Passenger vehicle 3 is located in lower front ramp 27 which is equipped with a hydraulic system to raise or lower the angle of passenger vehicle 3. Vehicle 2 is located on the intermediate front ramp 26 nose section while vehicle 8 is disposed on the intermediate rear lift out skid ramp 28. Vehicles 6, 7 and 1 are situated respectively on horizontal slidable ramps 23, 24 and 25 which slide through the channels formed by members 20, 21 and 22 respectively, hereinafter more explicitly depicted in FIG. 6. Truck cab 9 is coupled to trailer unit 10 at coupling junction 11. The trailer section possesses back wheel axles at 12 while the cab 9 possesses hydraulic means 13 to support vehicle 5. It is noted that vehicle 5 is supported by hydraulically slidable horizontal ramp 14 upon channel 15. The frame of trailer section 16 possesses rigid structural supports 17, top horizontal frame members 18, hydraulic systems 19 and conventional locking devices.

In the top plan view of FIG. 2 adjustable ramps 23, 24 and 25 are depicted without cars disposed thereon. Correspondingly, channels 20, 21 and 22 which provide a sliding track to enable adjustability of the respective ramps are shown with interconnecting studs 29. As a result of the limitation of size in the length of carriers, it is a preferred embodiment of this invention that back ramp 25 be only horizontally adjustable in the forward position (toward the cab). However, ramps 23 and 24 are bidirectionally adjustable. Bridging ramps 30 are shown to bridge gaps resulting from the movement forward of the corresponding ramps. Hold down ties 31 comprising a rotatable shaft, bearing and collar are equipped with a chain (not shown) to firmly anchor the axles of the respective passenger vehicles 7 and 1. The forward position of ramp 23 is supported by a frame support bar 32 conventially coupled to frame 16 by locking device 33.

The slideable feature of the ramps are more clearly shown in the individual ramp of FIG. 3 wherein any of the upper ramps, but most preferably ramps 23 and 24 are exemplified by member 34. As indicated by the respective arrows the ramps 34 may be moved outwardly from the solid line position. Parallel channels 35, exemplary of those disclosed as channels 20 - 22 of FIG. 1 are tied together by transverse supports 50. The channels form a track for the ramps 34, the slideability of the same being aided by rollers 36. After a desirable length of ramp has been achieved, the ramp length is held by pins 37 inserted through cooperating holes in channels 35 and ramp flanges 48. Also a chain 38 may be utilized to prevent ramps 34 from escaping from the channels in case of removal of pins 37 by vibrational disturbances or human error. The passenger vehicle may be disposed upon the length of the ramp and secured by a multiplicity of hold down devices similar to that of member 31 of FIG. 2. The hold down (sometimes called tie down) device will generally comprise a rotatable shaft 39, bearing support 40 and collar 41. A chain (not shown) may be wound around rotatable shaft 39 and anchored to the vehicle through opening 42. The rotatable shaft may be held in place by rachet means 43. This basic tie down system is further depicted in side view in FIGS. 4 and 5. Ramps 34 are shown to be adjustable by insertion of pins 37 in any of equally spaced holes 44 in flanges 48 of the ramps. Chain 38 is secured to pins 45 and 46 attached to a channel support member 50 and leading edge of ramp 34 respectively.

A transverse view of the support channels and ramp is shown in FIG. 6. The channels 35 are exemplary of any channel 20 - 22 of FIG. 1 and the slideably adjustable ramp 34 is exemplary of any ramp 23 - 25 of the same. The tie down system exemplified by rachet 43, rotatable shaft 39, bushing 40 and collar 41 is attached to the channel support 50. It can be seen that when the pins 37 are removed from channels 35 and flanges 48, the ramps are easily moved with respect to one another longitudinally via channels 35 and rollers 36. Bridging ramps 52 are attached as by welding to one of the ramps 34 to provide that no matter how far apart the horizontal tracks become extended, there will be a means of driving the vehicle thereover. As seen in FIG. 3, bridging ramp ends 52a are fixed to right-end ramp 34 and ends 52b are slideably supported on left-end ramp 34.

I claim as my invention:

1. A transportation vehicle carrier adapted for transporting eight compact passenger vehicles within a length of about 55 feet and a height of about 13½ feet, said passenger vehicles having a length of about 187 inches to 197 inches, a roof height of about 52 inches to 54 inches, and a wheel base of 103.0 inches to about 111.0 inches comprising in combination:

a. a tractor having a main frame with a cab at the front end thereof, a coupling reception means at the rear end thereof and a horizontally extending upper vehicle supporting ramp on the tractor in connection with said frame extending over said cab, said ramp having a substantially horizontally extending track therefrom and;

b. a trailer having a frame possessing at least one axle at the rear portion thereof and a coupling means at the front portion thereof to couple said trailer to said tractor, said trailer comprising:
  i. a bottom section comprising a front lower ramp and a back lower ramp wherein said front lower ramp is vertically adjustable to maintain one of said passenger vehicles at an angle of from about 35° to about 50° and wherein each of said ramps contains one of said passenger vehicles;
  ii. an intermediate section comprising an intermediate front ramp and an intermediate rearward back ramp wherein said intermediate ramps are vertically adjustable to an angle of from about 5° to 25° and wherein said intermediate front ramp is disposed to carry one of said passenger vehicles with a portion thereof disposed above said passenger vehicle disposed within said front lower ramp and said rearward intermediate ramp is disposed to carry one of said passenger vehicles with a portion thereof disposed above said passenger vehicle disposed within said bottom section back lower ramp; and,
  iii. an upper section comprising an upper front, upper middle and upper back ramp wherein said upper back ramp possesses a substantially horizontally adjustable planar track supporting surface telescoping in the direction of said cab and said upper front and upper middle ramps possess a substantially horizontal bidirectional extending planar track supporting surface and wherein each of said three upper ramps contains one of said passenger vehicles.

2. The vehicle carrier of claim 1 further characterized in that the bidirectional extending tracks traverse a distance of from about 114 inches to about 175 inches.

3. The vehicle carrier of claim 1 further characterized in that said upper back ramp is adjustable to a length of about 121 inches.

4. The vehicle carrier of claim 1 further characterized in that said upper front, upper middle and upper back adjustable tracks comprise two sliding metal elements for the containment of said passenger vehicle.

5. The vehicle carrier of claim 4 further characterized in that said sliding metal elements are interconnected by a metal cross piece at the ends of said tracks.

6. The vehicle carrier of claim 5 further characterized in that said metal cross pieces comprise the ends of said ramps in a retracted position.

7. The vehicle carrier of claim 1 further characterized in that said adjustable tracks comprise said metal sliding elements inwardly transverse an exterior metal channel element.

8. The vehicle carrier of claim 7 further characterized in that said metal horizontally sliding elements are locked in position by means of a locking peg and hole disposed through said elements and channels.

9. The vehicle carrier of claim 7 further characterized in that said metal channel elements are locked in vertical position by means of placement of a peg in a hole disposed in the vertical trailer side posts.

10. The vehicle carrier of claim 7 further characterized in that said metal channel elements are locked in vertical position by means of fluid hydraulic pressure.

11. The vehicle carrier of claim 1 further characterized in that said upper front ramp contains one of said passenger vehicles disposed over the vehicles disposed within said front lower ramp and said front intermediate ramp, said upper middle ramp contains one of said passenger vehicles disposed over the vehicles disposed within said lower front ramp, lower back ramp and intermediate back ramp and said upper back ramp contains one of said automotive vehicles disposed over the vehicles disposed within said intermediate back ramp and said lower back ramp.

12. An automotive vehicle trailer adapted for transporting seven passenger vehicles which comprises a frame possessing at least one axle disposed in the rear portion thereof and a coupling means disposed at the front portion thereof, said trailer comprising:
  a. a bottom section comprising a front lower ramp and a back lower ramp wherein said front lower ramp is vertically adjustable to maintain one of said passenger vehicles at an angle of from about 35° to about 50° and wherein each of said ramps contains one of said passenger vehicles;
  b. an intermediate section comprising an intermediate front ramp and a rearward intermediate back ramp wherein said intermediate ramps are vertically adjustable to an angle of from about 5° to 15° and wherein said intermediate front ramp is disposed to carry one of said passenger vehicles with a portion thereof positioned above said passenger vehicle disposed within said front lower ramp and said rearward intermediate ramp is disposed to carry one of said passenger vehicles with a portion thereof positioned above said passenger vehicle disposed within said bottom section back lower ramp; and,
  c. an upper section comprising an upper front, upper middle and upper back ramp wherein said upper back ramp possesses a substantially horizontal adjustable planar track supporting surface telescoping in the direction of said cab and said upper front and upper middle ramps possess a substantially horizontal bidirectional extending planar track supporting surface to maintain one of said passenger cars on said means.

13. The trailer of claim 12 further characterized in that said adjustable means are metal telescoping tracks sufficient to maintain the ramps at a distance of from about 114 inches to about 175 inches from end to end of the track.

14. The trailer of claim 12 further characterized in that said adjustable means comprises continuous metal tracks slideable in a bidirectional direction wherein the midsection of said tracks comprises a bridge of a continuous metal sheet.

15. The trailer of claim 14 further characterized in that said metal tracks are extendable by transversing metal channels within the frame of said vehicle.

16. The trailer of claim 15 further characterized in that said metal tracks are vertically adjustable by means of hydraulic pressure.

17. The trailer of claim 15 further characterized in that said metal tracks are lockable by means of placement of a peg in a hole disposed in the side of said channels.

18. The trailer of claim 12 further characterized in that the seven passenger vehicles are of compact car passenger size.

19. The trailer of claim 18 further characterized in that said compact cars possess a wheel base of from about 103.0 inches to about 111.0 inches, a height of about 52.9 inches to about 54.3 inches, and an over-all length of approximately 197 inches.

20. The trailer of claim 12 further characterized in that said automotive vehicles comprise from one to six trucks.

21. A transportation vehicle carrier adapted for transporting eight passenger vehicles which comprises in combination:
 a. a tractor having a main frame with a cab at the front end thereof, a coupling reception means at the rear end thereof and a horizontally extending upper vehicle supporting ramp on the tractor in connection with said frame extending over said cab, said ramp having a substantially horizontally extending track therefrom and;
 b. a trailer having a frame possessing at least one axle at the rear portion thereof and a coupling means at the front portion thereof to couple said trailer to said tractor, said trailer comprising:
  i. a bottom section comprising a front lower ramp and a back lower ramp wherein each of said ramps contain one of said passenger vehicles;
  ii. an intermediate section comprising an intermediate front ramp and an intermediate back ramp wherein said intermediate front ramp is disposed to carry one of said passenger vehicles with a portion thereof disposed above said passenger vehicle disposed within said front lower ramp and said rearward intermediate ramp is disposed to carry one of said passenger vehicles with a portion thereof disposed above said passenger vehicle disposed within said bottom section back lower ramp; and,
  iii. an upper section comprising an upper front, upper middle and upper back ramp wherein said upper back ramp possesses a substantially horizontally adjustable planar track supporting surface telescoping in the direction of said cab and said upper front and upper middle ramps possess a substantially horizontal bidirectional extending planar track supporting surface and wherein each of said three upper ramps contains one of said passenger vehicles.

\* \* \* \* \*